(12) United States Patent
Chozhiyath Raman et al.

(10) Patent No.: US 11,645,525 B2
(45) Date of Patent: May 9, 2023

(54) NATURAL LANGUAGE EXPLANATION FOR CLASSIFIER PREDICTIONS

(71) Applicant: International Business Machines Corporation, Armonk, NY (US)

(72) Inventors: Poornima Chozhiyath Raman, San Jose, CA (US); Prithviraj Sen, San Jose, CA (US); Yunyao Li, San Jose, CA (US); Dakshi Agrawal, Nanuet, NY (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 16/884,619

(22) Filed: May 27, 2020

(65) Prior Publication Data

US 2021/0374516 A1    Dec. 2, 2021

(51) Int. Cl.
| | |
|---|---|
| *G06F 17/00* | (2019.01) |
| *G06N 3/08* | (2023.01) |
| *G10L 15/26* | (2006.01) |
| *G06F 40/40* | (2020.01) |
| *G06F 16/35* | (2019.01) |

(52) U.S. Cl.
CPC ............. *G06N 3/08* (2013.01); *G06F 16/353* (2019.01); *G06F 40/40* (2020.01); *G10L 15/26* (2013.01)

(58) Field of Classification Search
CPC .......... G06N 3/08; G06N 5/045; G06N 20/20; G06F 16/353; G06F 40/40; G06F 40/56; G10L 15/26
See application file for complete search history.

(56) References Cited

U.S. PATENT DOCUMENTS

| | | | |
|---|---|---|---|
| 8,543,401 B2 | 9/2013 | Suendermann et al. | |
| 8,606,733 B2 | 12/2013 | Marchesotti et al. | |
| 9,058,327 B1* | 6/2015 | Lehrman | G06F 16/353 |
| 10,275,516 B2 | 4/2019 | King et al. | |
| 2018/0232528 A1* | 8/2018 | Williamson | G06N 20/00 |

(Continued)

OTHER PUBLICATIONS

Hancock, Braden, et al. "Training classifiers with natural language explanations." Proceedings of the conference. Association for Computational Linguistics. Meeting. vol. 2018. NIH Public Access, 2018 (Year: 2018).*

(Continued)

*Primary Examiner* — Andrew T McIntosh
(74) *Attorney, Agent, or Firm* — Stephanie L. Carusillo

(57) ABSTRACT

In an approach, a processor trains a statistical classifier and a set of micro classifiers. A processor receives an input to be classified by the statistical classifier. A processor receives a label assigned to the input by the statistical classifier and respective labels assigned by each micro classifier of the set of micro classifiers. A processor determines that the label assigned by the statistical classifier is the same as at least one label assigned by at least one micro classifier of the set of micro classifiers. A processor generates a natural language explanation for assigning the label using the at least one micro classifier and the label. A processor outputs the label and the natural language explanation to a user of a computing device. A processor receives user feedback from the user in the form of an acceptance or a rejection of the natural language explanation.

17 Claims, 5 Drawing Sheets

(56) References Cited

U.S. PATENT DOCUMENTS

2020/0380212 A1* 12/2020 Butler ............... G06F 16/211
2021/0240917 A1* 8/2021 Sen .................. G06N 5/045

OTHER PUBLICATIONS

Liu, Hui, Qingyu Yin, and William Yang Wang. "Towards explainable NLP: A generative explanation framework for text classification." arXiv preprint arXiv:1811.00196 (2018) (Year: 2018).*

Zhou, Ming, et al. "Progress in neural NLP: modeling, learning, and reasoning." Engineering 6.3 (2020): 275-290 (Year: 2020).*

Caines, et al. "Automatically Identifying the Function and Intent of Posts in Underground Forums",Crime Science, Caines2018; Published Nov. 29, 2018, pp. 1-14. <https://doi.org/10.1186/s40163-018-0094-4>.

Disclosed Anonymously et al, "Method and System for Iterative Topic Identification Using Conversation Data", ip.com Prior Art Database Technical Disclosure, IPCOM000259350D, Aug. 1, 2019, pp. 1-4.

Disclosed Anonymously et al, "Adapting Conversation Based on Perceived User Expertise"; ip.com Prior Art Database Technical Disclosure, IPCOM000258019D, Apr. 1, 2019, pp. 1-5.

Gottipati, et al, "Text Analytics Approach To Extract Course Improvement Suggestions From Students' Feedback", Research and Practice In Technology Enhanced Learning,, 2018, pp. 1-19, <https://doi.org/10.1186/s41039-018-0073-0>.

IBM et al, "A System and Method for Topic Segmentation and Topic Lineage in Text Documents"; ip.com Prior Art Database Technical Disclosure, IPCOM000184419D, Jun. 23, 2009, pp. 1-8.

Reiter et al, "Building Applied Natural Language Generation Systems," Natural Language Engineering, Cambridge University Press, May 20, 1997, pp. 1-32.

Srivastava, et al, "Zero-Shot Learning of Classifiers From Natural Language Quantification", School of Computer Science Carnegie Mellon University, Pittsburgh, PA, 2017 pp. 306-316.

* cited by examiner

NATURAL LANGUAGE EXPLANATION FOR CLASSIFIER PREDICTIONS

BACKGROUND

The present invention relates generally to the field of text classification, and more particularly to providing a natural language explanation for classifier predictions.

Natural Language Processing, usually shortened as NLP, is a branch of artificial intelligence that deals with the interaction between computers and humans using the natural language. The ultimate objective of NLP is to read, decipher, understand, and make sense of the human languages in a manner that is valuable. Most NLP techniques rely on machine learning to derive meaning from human languages. In fact, a typical interaction between humans and machines using NLP could go as follows: 1. A human talks to the machine; 2. The machine captures the audio; 3. Audio to text conversion takes place; 4. Processing of the text's data; 5. Data to audio conversion takes place; and 6. The machine responds to the human by playing the audio file.

NLP is the driving force behind the following common applications: language translation applications, word processors, Interactive Voice Response (IVR) applications used in call centers to respond to certain users' requests, and personal assistant applications.

The rules that dictate the passing of information using natural languages are not easy for computers to understand. Some of these rules can be high-leveled and abstract; for example, when someone uses a sarcastic remark to pass information. On the other hand, some of these rules can be low leveled; for example, using the character "s" to signify the plurality of items. Comprehensively understanding the human language requires understanding both the words and how the concepts are connected to deliver the intended message. The ambiguity and imprecise characteristics of the natural languages are what make NLP difficult for machines to implement.

NLP entails applying algorithms to identify and extract the natural language rules such that the unstructured language data is converted into a form that computers can understand. When the text has been provided, the computer will utilize algorithms to extract meaning associated with every sentence and collect the essential data from them. Sometimes, the computer may fail to understand the meaning of a sentence well leading to obscure results.

SUMMARY

Aspects of an embodiment of the present invention disclose a method, computer program product, and computer system for providing a natural language explanation for classifier predictions. A processor trains a statistical classifier and a set of micro classifiers on a set of data. A processor receives an input to be classified by the statistical classifier. A processor receives a label assigned to the input by the statistical classifier and respective labels assigned by each micro classifier of the set of micro classifiers. A processor determines that the label assigned by the statistical classifier is the same as at least one label assigned by at least one micro classifier of the set of micro classifiers. A processor generates a natural language explanation for assigning the label using the at least one micro classifier and the label assigned by the statistical classifier. A processor outputs the label and the natural language explanation for the label assignment to a user through a user interface of a computing device. A processor receives user feedback from the user in the form of an acceptance or a rejection of the natural language explanation.

In some aspects of an embodiment of the present invention, training the statistical classifier and the set of micro classifiers on the set of data involves a processor receiving a set of labeled data and a set of unlabeled data from the user through the user interface on the computing device; a processor training the statistical classifier on the set of labeled data to learn to assign a respective label based on the set of labeled data, wherein a respective label correlates to a subject matter of a respective piece of data; a processor training the statistical classifier on the set of unlabeled data to learn to assign a respective label to a respective input; a processor performing data augmentation using the statistical classifier on the set of unlabeled data to produce augmented unlabeled data; and a processor training a neural network on the augmented unlabeled data and the set of labeled data to produce the set of micro classifiers.

In some aspects of an embodiment of the present invention, receiving the input involves receiving the input from a user through a user interface on a computing device.

In some aspects of an embodiment of the present invention, the at least one micro classifier of the set of micro classifiers includes at least two micro classifiers of the set of micro classifiers.

In some aspects of an embodiment of the present invention, generating the natural language explanation for assigning the label using the at least one micro classifier and the label assigned by the statistical classifier further involves a processor reviewing an accuracy percentage of each of the at least two micro classifiers during training in correctly assigning a respective label to a piece of data; a processor selecting a respective micro classifier of the at least two micro classifiers with a higher accuracy percentage; and a processor generating the natural language explanation for assigning the label using the selected micro classifier and the label assigned by the statistical classifier.

In some aspects of an embodiment of the present invention, responsive to a processor receiving the acceptance of the natural language explanation from the user, a processor outputs additional natural language explanations for additional inputs using the at least one micro classifier. A processor denotes the at least one micro classifier as a good micro classifier.

In some aspects of an embodiment of the present invention, responsive to a processor receiving the rejection of the natural language explanation from the user, a processor denotes the at least one micro classifier as a bad micro classifier. A processor prunes the at least one micro classifier from the set of micro classifiers.

DETAILED DESCRIPTION

Figure 1:
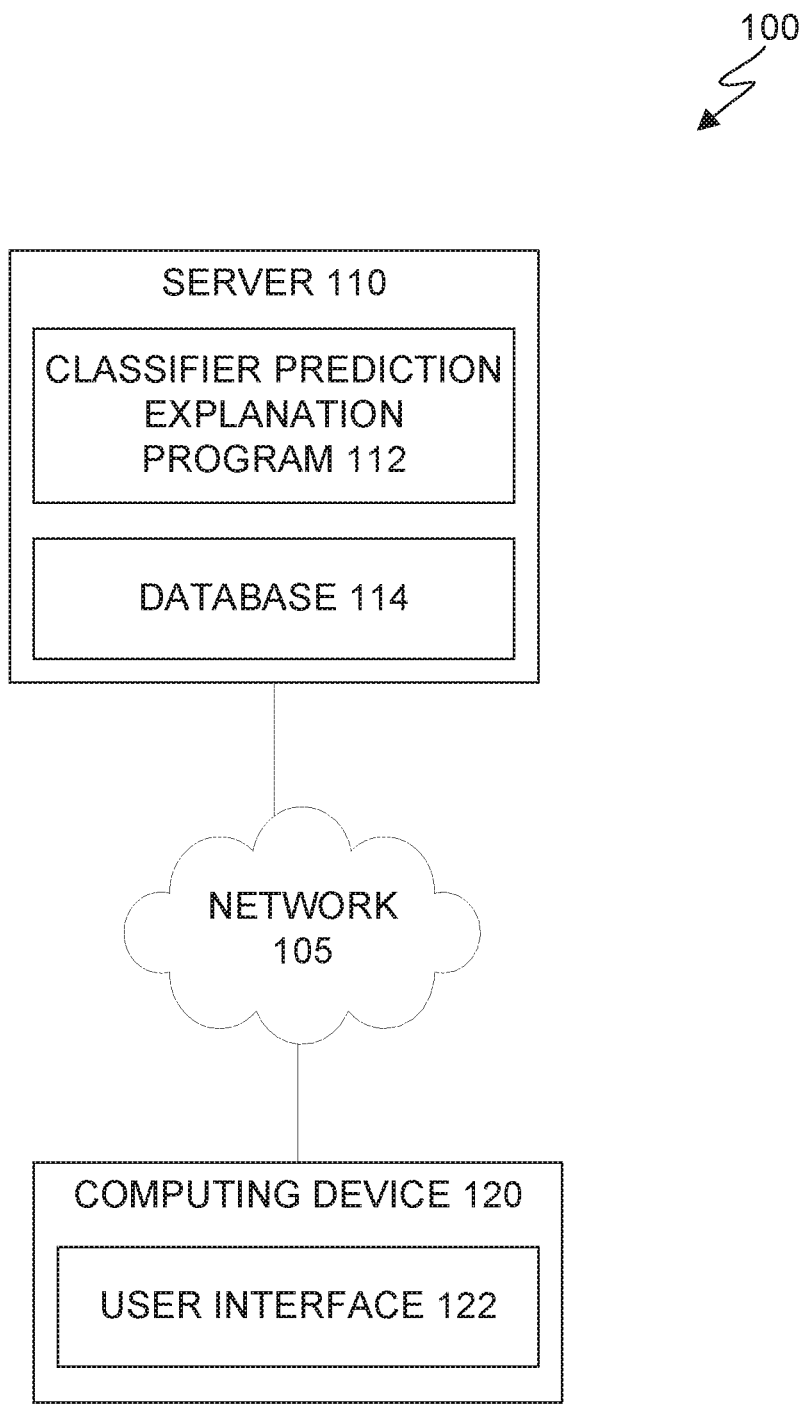
FIG. 1 depicts a block diagram of a distributed data processing environment, in accordance with an embodiment of the present invention.

Embodiments of the present invention recognize that text classification is a fundamental problem in natural language processing (NLP). Many text classification algorithms (classifiers) exist today that are used for different use cases. One of the common use cases is the task of sentiment analysis, i.e., classify whether text has positive or negative sentiment. Another use case is to classify sentences in legal documents into predefined one or more categories. In both these use cases, when the classifier makes a prediction on the given input text, providing an explanation on why that prediction was made is closely related to how well the user who reviews the prediction will trust the prediction. Embodiments of the present invention recognize the challenge in providing explanations for predictions given by a statistical classifier. Embodiments of the present invention further recognize that no system exists currently that can provide a natural language explanation of a prediction made by a statistical classifier.

Definitions for common terms used throughout the detailed description will now be presented. For the purposes of the present invention, "classification" is defined as the act of assigning a label to an input from a known taxonomy of labels. For the purposes of the present invention, "binary classification" is defined as the act of deciding whether a given label should be assigned to an input or not. For the purposes of the present invention, "classifier" is defined as a program that assigns labels automatically to given data. For the purposes of the present invention, a "micro classifier" consists of a multitude of conditions, and if all the conditions hold, then the micro classifier assigns the label to the input. Optionally, for a collection of micro classifiers, if any of the micro classifiers assigns the label, then the input gets the label. For the purposes of the present invention, a "statistical classifier" is defined as a mathematical model that embodies a set of statistical assumptions concerning the generation of sample data. For the purposes of the present invention, a "natural language explanation" is defined as an explanation for why a prediction is made by a classifier in natural language. For the purposes of the present invention, a "natural language generation" is defined as the act of generating a natural language explanation on why a prediction was made given the unseen input and the micro classifier that assigns a label to this input. For the purposes of the present invention, a "rule learner" is defined as a neural network that is trained using labeled data to produce a set of micro classifiers. For the purposes of the present invention, a "feedback" is defined as information provided by a user (e.g., customer) with regard to model results and consists of the correctness of the predicted label or the correctness of the provided natural language explanation.

Embodiments of the present invention contain two phases: (1) a training phase where the required classifiers are trained using labeled and unlabeled data and (2) an inference and feedback phase where the trained classifiers are used for assigning a label to an input sentence along with providing an explanation for the inference. In the second phase, users of the system will be allowed to provide feedback, which in turn is used for overall improvement of the system.

In the training phase, embodiments of the present invention provide a program for training two types of classifiers—a statistical classifier and a set of micro classifiers. Embodiments of the present invention train the statistical classifier with labeled input data so that the classifier can learn to assign a label based on sentences and labels present in the labeled input data. Optionally, embodiments of the present invention train the statistical classifier with unlabeled input data so that the classifier can learn better for the task of assigning a label to the input sentence. Embodiments of the present invention produce a set of micro classifiers by training a rule learner. Optionally, embodiments of the present invention perform data augmentation using the statistical classifier on unlabeled data. Embodiments of the present invention use this augmented unlabeled data along with labeled data to train the rule learner and produce the set of micro classifiers.

In the inference and feedback phase, embodiments of the present invention provide a program that utilizes the trained statistical classifier and set of micro classifiers to assign a label to an input sentence and provide an explanation for assigning the particular label.

Embodiments of the present invention provide a system and associated methods for providing natural language explanations for statistical classifier predictions. Embodiments of the present invention train a statistical classifier and a set of micro classifiers given a set of labeled and unlabeled data. Embodiments of the present invention utilize the micro classifiers for providing a natural language explanation for a prediction made by the statistical classifier on an input. Embodiments of the present invention provide a system and associated methods that can provide improved explanations overtime based on user feedback.

The present invention will now be described in detail with reference to the Figures.

FIG. 1 depicts a functional block diagram illustrating distributed data processing environment 100, in accordance with an embodiment of the present invention. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes server 110 and computing device 120 interconnected over network 105. In an embodiment, distributed data processing environment 100 represents a system for providing natural language explanations for statistical classifier predictions. Network 105 can be, for example, a local area network (LAN), a wide area network (WAN) such as the Internet, or a combination of the two, and can include wired, wireless, or fiber optic connections. Network 105 can include one or more wired and/or wireless networks that are capable of receiving and transmitting data, voice, and/or video signals, including multimedia signals that include voice, data, and video information. In general, network 105 can be any combination of connections and protocols that will support communications between server 110 and computing device 120. Distributed data processing environment 100 may include additional servers, computers, or other devices not shown.

Server 110 operates to run classifier prediction explanation program 112 and manage database 114. In the depicted embodiment, server 110 contains classifier prediction explanation program 112 and database 114. In some embodiments, server 110 can be a standalone computing device, a management server, a web server, a mobile computing device, or any other electronic device or computing system capable of receiving, sending, and processing data. In some embodiments, server 110 may be a laptop computer, tablet computer, netbook computer, personal computer (PC), a desktop computer, a smart phone, or any programmable electronic device capable of communicating with computing device 120 via network 105. In other embodiments, server 110 represents a server computing system utilizing multiple computers as a server system, such as a cloud computing environment. In yet other embodiments, server 110 represents a computing system utilizing clustered computers and components (e.g., database server computers, application server computers, etc.) that act as a single pool of seamless resources when accessed within distributed data processing environment 100. Server 110 may include components as described in further detail in FIG. 5.

Classifier prediction explanation program 112 operates to train a statistical classifier and a set of micro classifiers on labeled and unlabeled data, utilize the trained statistical classifier and the set of micro classifiers to assign a label to an input sentence, provide an explanation for assigning the particular label, and receive feedback from users to improve explanations overtime. In the depicted embodiment, classifier prediction explanation program 112 resides on server 110 with user interface 122 being the local app interface of classifier prediction explanation program 112 on computing device 120. In other embodiments, classifier prediction explanation program 112 may reside on another device (not shown) provided that classifier prediction explanation program 112 has access to network 105. Classifier prediction explanation program 112 is described in more detail below with reference to FIGS. 2-4.

Database 114 operates as a repository for data received, used, and/or output by classifier prediction explanation program 112. Data received, used, and/or generated may include, but is not limited to, a set of labeled input data; a set of unlabeled input data; an input, e.g., a sentence, a textual document, etc.; and any other data received, used, and/or output by classifier prediction explanation program 112. Database 114 can be implemented with any type of storage device capable of storing data and configuration files that can be accessed and utilized by server 110, such as a hard disk drive, a database server, or a flash memory. In an embodiment, database 114 is accessed by server 110, classifier prediction explanation program 112, and/or computing device 120 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that database 114 has access to network 105.

Computing device 120 operates to send and receive data through a user interface. In some embodiments, computing device 120 may be, but is not limited to, an electronic device, such as a laptop computer, a tablet computer, a netbook computer, a personal computer (PC), a desktop computer, a smart phone, or any programmable electronic device capable of running user interface 122 and communicating (i.e., sending and receiving data) with server 110 and/or classifier prediction explanation program 112 via network 105. In some embodiments, computing device 120 represents one or more programmable electronic devices or combination of programmable electronic devices capable of executing machine readable program instructions and communicating with server 110 and/or other computing devices within distributed data processing environment 100 via a network, such as network 105. In an embodiment, computing device 120 represents one or more devices associated with a user. In the depicted embodiment, computing device 120 includes an instance of user interface 122. Computing device 120 may include components as described in further detail in FIG. 5.

User interface 122 operates as a local user interface on computing device 120 through which one or more users of computing device 120 interact with computing device 120. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from classifier prediction explanation program 112 via network 105. In an embodiment, user interface 122 enables a user to send and receive data, e.g., to and from classifier prediction explanation program 112 via network 105, respectively. In an embodiment, user interface 122 enables a user to upload a set of labeled data and/or a set of unlabeled data for training. In an embodiment, user interface 122 enables a user to upload an input (e.g., a textual document) for labeling. In an embodiment, user interface 122 enables a user to view a label and natural language explanation output by classifier prediction explanation program 112. In an embodiment, user interface 122 enables a user to send user feedback regarding the label and/or the natural language explanation to classifier prediction explanation program 112.

Figure 2:
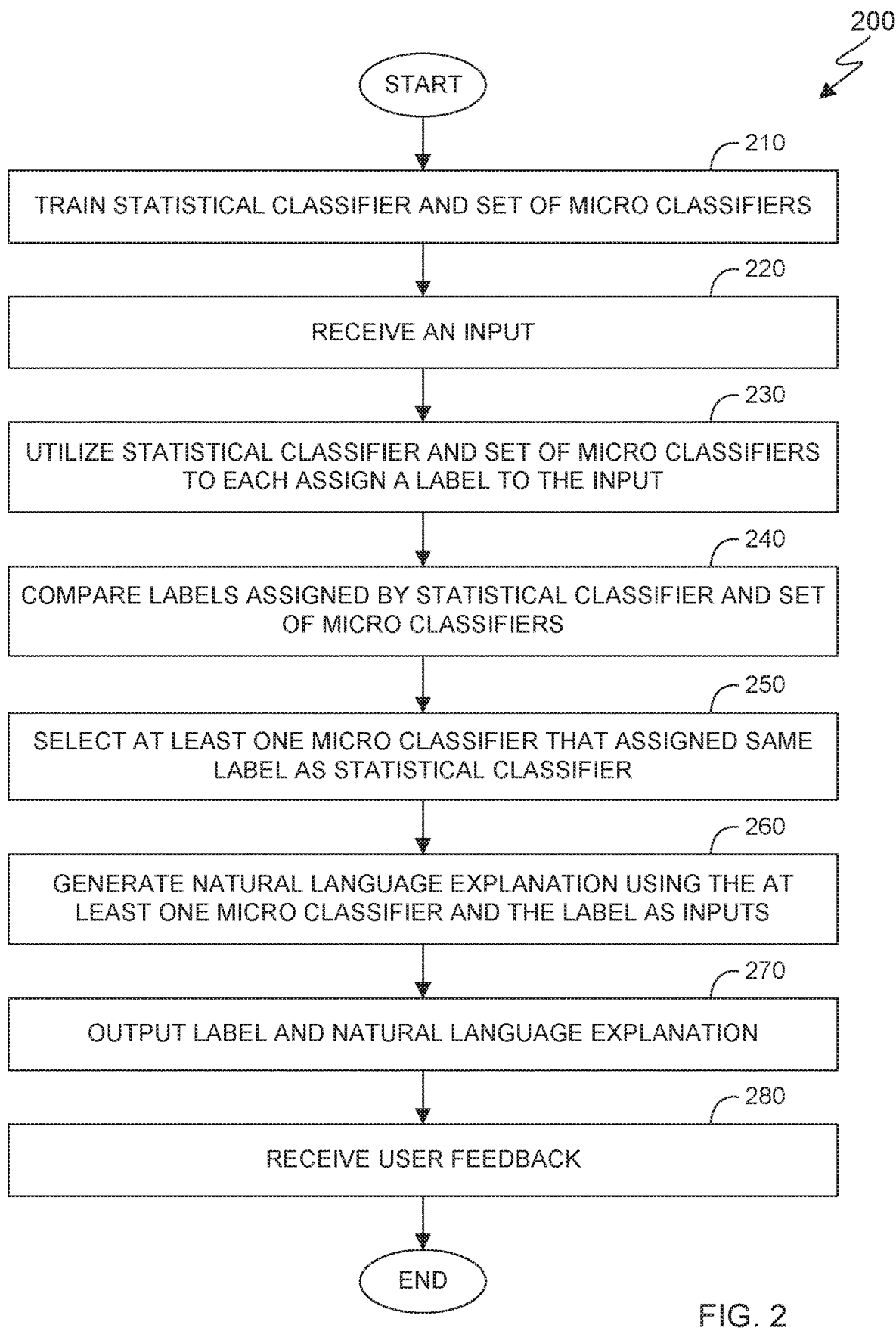
FIG. 2 depicts a flowchart of the steps of a classifier prediction explanation program for providing a natural language explanation for statistical classifier predictions, in accordance with an embodiment of the present invention.

FIG. 2 depicts a flowchart 200 of the steps of classifier prediction explanation program 112, for providing a natural language explanation for statistical classifier predictions, in accordance with an embodiment of the present invention. In an embodiment, classifier prediction explanation program 112 trains a statistical classifier and a set of micro classifiers on labeled and unlabeled data, utilizes the trained statistical classifier and the set of micro classifiers to assign a label to an input sentence, provides an explanation for assigning the particular label, and receives feedback from users to improve explanations overtime. It should be appreciated that the process depicted in FIG. 2 illustrates one possible iteration of classifier prediction explanation program 112, which can repeat for training this system on a different set of input data with a different set of labels.

In step 210, classifier prediction explanation program 112 trains a statistical classifier and a set of micro classifiers. In an embodiment, classifier prediction explanation program 112 trains a statistical classifier and a set of micro classifiers on a set of labeled data. In some embodiments, classifier prediction explanation program 112 trains a statistical classifier and a set of micro classifiers on a set of labeled and unlabeled data. In an embodiment, classifier prediction explanation program 112 trains a statistical classifier and a set of micro classifiers on a set of labeled input sentences, in which a label correlates to the subject matter of an input sentence. In an embodiment, classifier prediction explanation program 112 receives the set of labeled and/or unlabeled data from a user through a user interface on a user computing device, e.g., user interface 122 on user computing device 120. The process of training the statistical classifier and the set of micro classifiers is described in more detail below with reference to FIG. 3.

Figure 3:
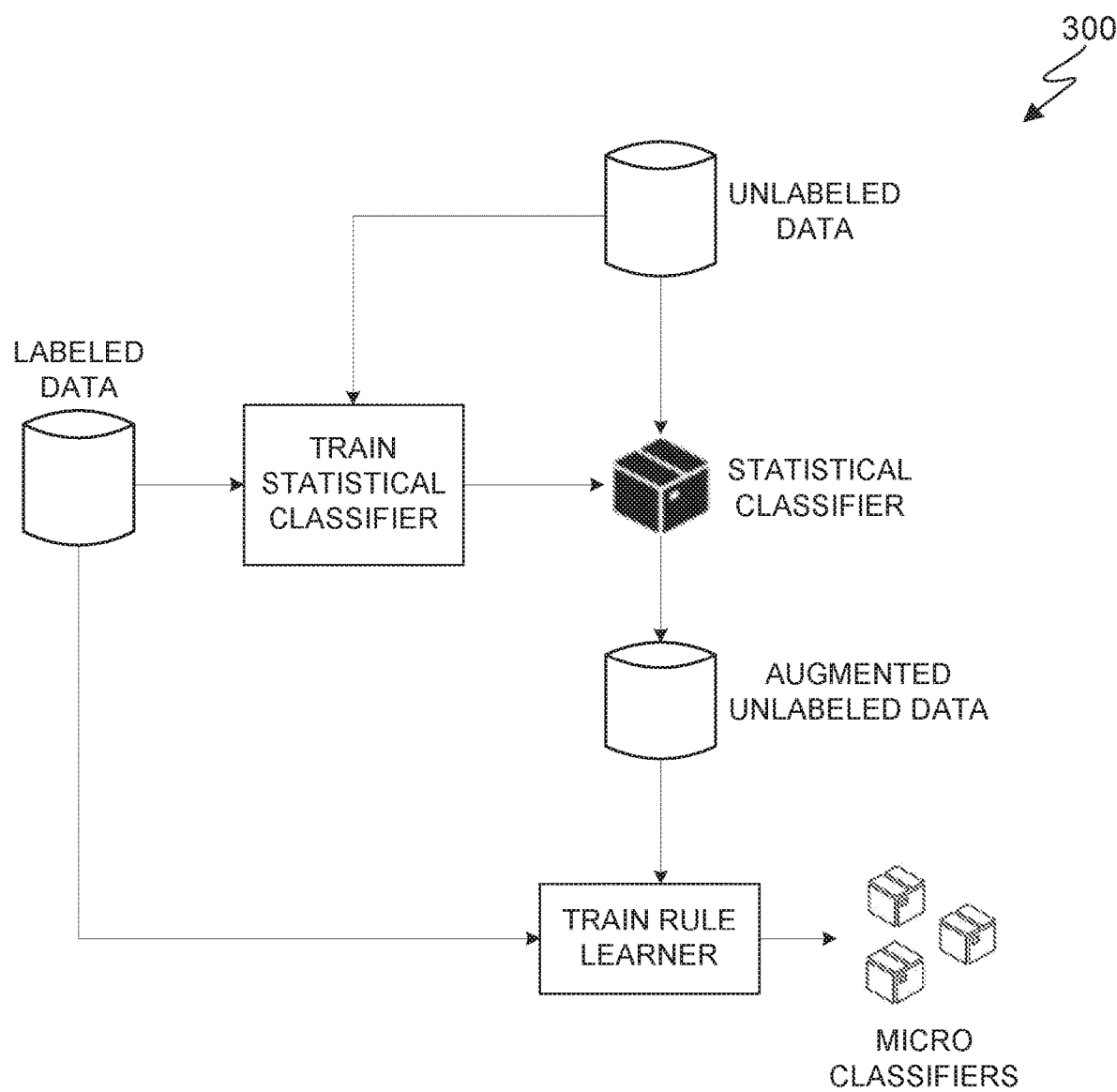
FIG. 3 depicts a process flow diagram for training a statistical classifier and a set of micro classifiers, in accordance with an embodiment of the present invention.

FIG. 3 depicts a process flow diagram 300 for step 210 of classifier prediction explanation program 112, for training a statistical classifier and a set of micro classifiers for providing a natural language explanation for the statistical classifier's predictions, in accordance with an embodiment of the present invention. In an embodiment, a Natural Language Processing (NLP) model (e.g., Bidirectional Encoder Representations from Transformers (BERT) model) is trained with a set of labeled input data to produce a statistical classifier that learns to assign a label based on the set of labeled input data, e.g., a set of sentences with labels. Optionally, in some embodiments, the statistical classifier is also trained with a set of unlabeled input data so that the statistical classifier can learn better for the task of assigning a label to an input. In an embodiment, a set of micro classifiers are produced by training a rule learner, i.e., neural network. Optionally, in some embodiments, data augmentation is performed using the statistical classifier on the set of unlabeled data. In an embodiment, the augmented unlabeled data is used along with the set of labeled data to train the rule learner and produce the set of micro classifiers.

Referring back to FIG. 2, in step 220, classifier prediction explanation program 112 receives an input. In an embodiment, classifier prediction explanation program 112 receives an input, e.g., in the form of a text document or a singular text sentence. In an embodiment, classifier prediction explanation program 112 receives an input from a user through a user interface on a user computing device, e.g., user interface 122 on computing device 120. In some embodiments, responsive to receiving the input, classifier prediction explanation program 112 proceeds to step 230.

In step 230, classifier prediction explanation program 112 utilizes the trained statistical classifier and the produced set of micro classifiers to each assign a label to the input. In an embodiment, classifier prediction explanation program 112 utilizes the trained statistical classifier and the produced set of micro classifiers to each assign a label to the input sentence. In an embodiment, classifier prediction explanation program 112 inputs the received input into the trained statistical classifier and the produced set of micro classifiers. In an embodiment, classifier prediction explanation program 112 receives a label output from the statistical classifier and a label output from the set of micro classifiers. In some embodiments, responsive to receiving the label output from the statistical classifier and labels output from the set of micro classifiers, classifier prediction explanation program 112 proceeds to step 240.

In some embodiments, responsive to receiving a label output by the statistical classifier, classifier prediction explanation program 112 outputs the prediction (i.e., label assigned by the statistical classifier) to a user through a user interface, e.g., user interface 122 on computing device 120. In these embodiments, responsive to receiving a request from a user for an explanation for the prediction, classifier prediction explanation program 112 proceeds to step 240.

In step 240, classifier prediction explanation program 112 compares the labels assigned by the statistical classifier and the set of micro classifiers. In an embodiment, classifier prediction explanation program 112 compares the label assigned by the statistical classifier with each label assigned by each micro classifier of the set of micro classifiers. In an embodiment, classifier prediction explanation program 112 determines whether the label assigned by the statistical classifier is the same as at least one label assigned by one of the micro classifiers of the set of micro classifiers. In an embodiment, responsive to determining the label assigned by the statistical classifier is the same as at least one label assigned by at least one of the micro classifiers of the set of micro classifiers, classifier prediction explanation program 112 proceeds to step 250.

In step 250, classifier prediction explanation program 112 selects the at least one micro classifier that assigned the same label as the statistical classifier. In an embodiment, classifier prediction explanation program 112 selects the at least one micro classifier for generating the natural language explanation for the prediction, i.e., assigned label. In some embodiments in which at least two micro classifiers assigned the same label as the statistical classifier, classifier prediction explanation program 112 reviews the at least two micro classifiers and selects a micro classifier from these at least two micro classifiers that has the highest quality for generating the natural language explanation for the prediction, i.e., assigned label. The term "highest quality" is based on accuracy of the micro classifier during the training phase in correctly classifying or predicting the label for a piece of data, so a micro classifier with the "highest quality" is the one with the higher accuracy percentage from the training phase. In an embodiment, responsive to selecting the at least one micro classifier that assigned the same label as the statistical classifier, classifier prediction explanation program 112 proceeds to step 260.

Figure 4:
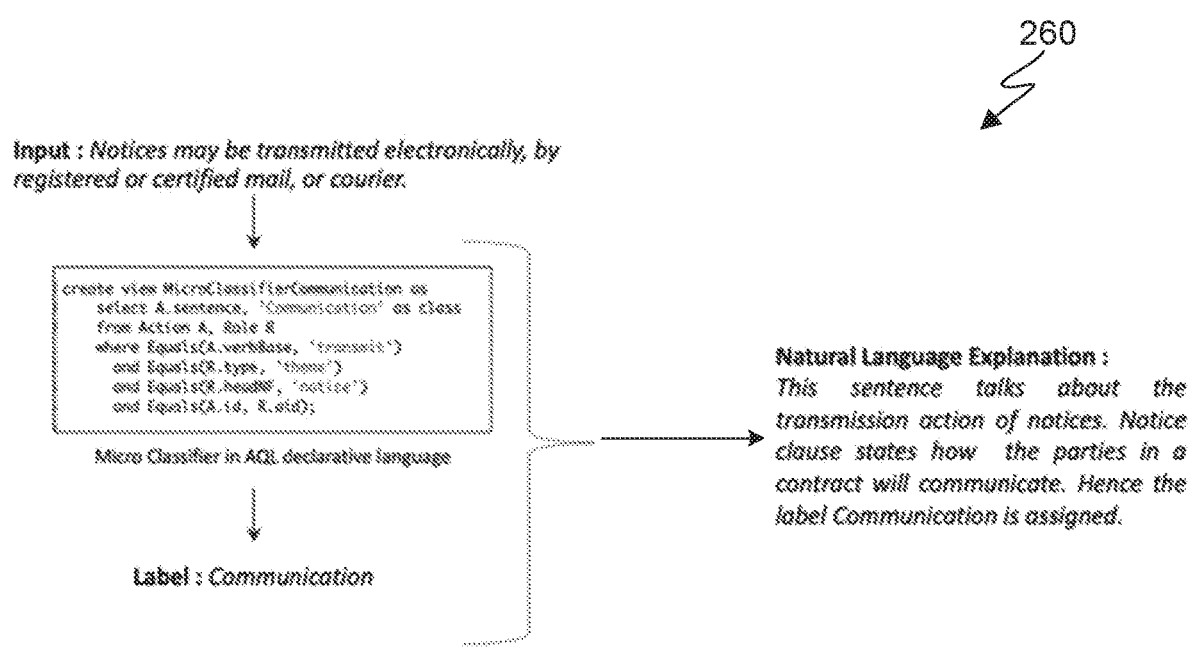
FIG. 4 depicts an exemplary process flow diagram for generating a natural language explanation using a micro classifier and a label, in accordance with an embodiment of the present invention.

In step 260, classifier prediction explanation program 112 generates a natural language explanation using the at least one micro classifier and the label as inputs. In an embodiment, classifier prediction explanation program 112 generates a natural language explanation using a template-based natural language generation technique as known to a person of skill in the art. In an embodiment, classifier prediction explanation program 112 generates a natural language explanation using the at least one micro classifier and the label assigned by the statistical classifier. In some embodiments, classifier prediction explanation program 112 generates a natural language explanation using the highest quality micro classifier and the label assigned by the statistical classifier. FIG. 4 depicts an exemplary process flow diagram for generating a natural language explanation using a micro classifier and a label, in accordance with an embodiment of the present invention. As depicted in FIG. 4, responsive to receiving the input sentence from a legal document—"Notices may be transmitted electronically, by registered or certified mail, or courier."—and assigning the label "Communication", classifier prediction explanation program 112 utilizes a micro classifier, depicted in FIG. 4 as a multitude of conditions written in Annotation Query Language (AQL) declarative language, that classified the input sentence as "Communication" and the label itself to generate a natural language explanation for the "Communication" prediction. In an embodiment, responsive to generating the natural language explanation, classifier prediction explanation program 112 proceeds to step 270.

In step 270, classifier prediction explanation program 112 outputs the label and natural language explanation. In an embodiment, classifier prediction explanation program 112 outputs the label and the natural language explanation for the label assignment. In an embodiment, classifier prediction explanation program 112 outputs the label and the natural language explanation for the label assignment to a user through a user interface, e.g., user interface 122 on computing device 120. In embodiments in which the label was already output to the user during step 230, classifier prediction explanation program 112 outputs the natural language explanation for the label assignment as requested by the user through a user interface, e.g., user interface 122 on computing device 120.

In step 280, classifier prediction explanation program 112 receives user feedback. In an embodiment, classifier prediction explanation program 112 receives feedback from a user to improve future explanations. In an embodiment, classifier prediction explanation program 112 receives feedback from a user through a user interface, e.g., user interface 122 on computing device 120. In an embodiment, classifier prediction explanation program 112 receives feedback from a user in the form of an acceptance or rejection of the natural language explanation. If classifier prediction explanation program 112 receives an acceptance of the natural language explanation from the user, classifier prediction explanation program 112 outputs more natural language explanations for additional inputs, e.g., additional sentences within an inputted legal document using the same micro classifier. If classifier prediction explanation program 112 receives an acceptance of the additional natural language explanations from the user, classifier prediction explanation program 112 denotes the micro classifier used to produce the natural language explanations as a "good" micro classifier. If classifier prediction explanation program 112 receives a rejection of the natural language explanation or a rejection of the prediction from the user, classifier prediction explanation program 112 denotes the micro classifier used to produce the natural language explanations as a "bad" micro classifier. As classifier prediction explanation program 112 receives more and more user feedback, classifier prediction explanation program 112 prunes the set of micro classifiers, thus improving the quality of the system as a whole and the natural language explanations outputs overtime.

Figure 5:
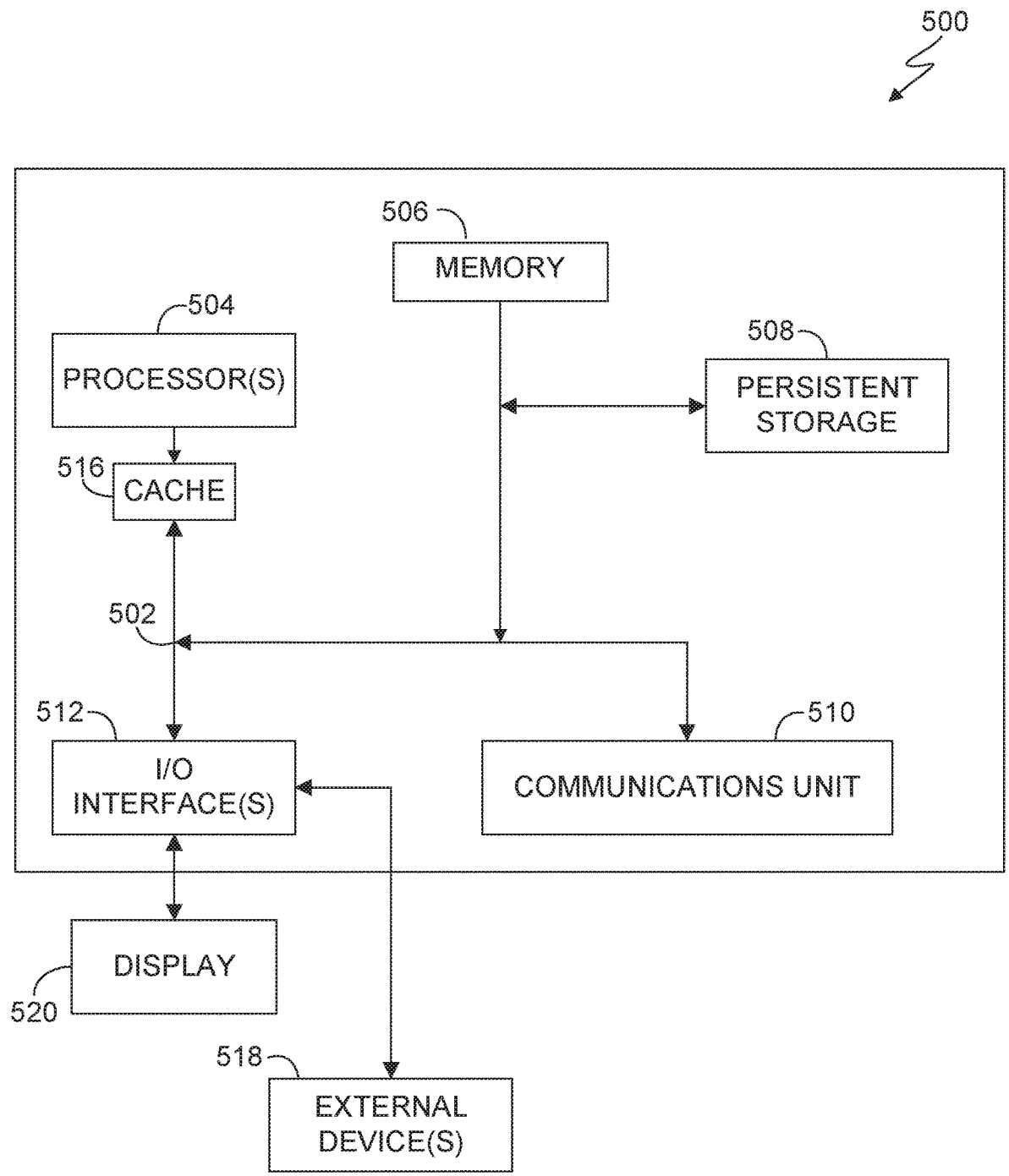
FIG. 5 depicts a block diagram of a computing device of the distributed data processing environment, in accordance with an embodiment of the present invention.

FIG. 5 depicts a block diagram of components of computing device 500 suitable for server 110 and/or computing device 120 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs may be downloaded to persistent storage 508 through communications unit 510.

I/O interface(s) 512 allows for input and output of data with other devices that may be connected to server 110 and/or computing device 120. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for providing a natural language explanation for statistical classifier predictions, the computer-implemented method comprising:
   receiving, by one or more processors, a set of labeled data and a set of unlabeled data from a user through a user interface on the computing device;
   training, by the one or more processors, a statistical classifier on the set of labeled data to learn to assign a respective label based on the set of labeled data, wherein a respective label correlates to a subject matter of a respective piece of data;
   training, by the one or more processors, the statistical classifier on the set of unlabeled data to learn to assign a respective label to a respective input;
   performing, by the one or more processors, data augmentation using the statistical classifier on the set of unlabeled data to produce augmented unlabeled data;
   training, by the one or more processors, a neural network on the augmented unlabeled data and the set of labeled data to produce a set of micro classifiers;

receiving, by the one or more processors, an input to be classified by the statistical classifier;

receiving, by the one or more processors, a label assigned to the input by the statistical classifier and respective labels assigned by each micro classifier of the set of micro classifiers;

determining, by the one or more processors, that the label assigned by the statistical classifier is the same as at least one label assigned by at least one micro classifier of the set of micro classifiers; and generating, by the one or more processors, a natural language explanation for assigning the label using the at least one micro classifier and the label assigned by the statistical classifier.

2. The computer-implemented method of claim 1, wherein receiving the input further comprises:

receiving, by the one or more processors, the input from a user through a user interface on a computing device.

3. The computer-implemented method of claim 1, wherein the at least one micro classifier of the set of micro classifiers includes at least two micro classifiers of the set of micro classifiers.

4. The computer-implemented method of claim 3, wherein generating the natural language explanation for assigning the label using the at least one micro classifier and the label assigned by the statistical classifier further comprises:

reviewing, by the one or more processors, an accuracy percentage of each of the at least two micro classifiers during training in correctly assigning a respective label to a piece of data;

selecting, by the one or more processors, a respective micro classifier of the at least two micro classifiers with a higher accuracy percentage; and generating, by the one or more processors, the natural language explanation for assigning the label using the selected micro classifier and the label assigned by the statistical classifier.

5. The computer-implemented method of claim 1, further comprising:

responsive to receiving the acceptance of the natural language explanation from the user, outputting, by the one or more processors, additional natural language explanations for additional inputs using the at least one micro classifier; and denoting, by the one or more processors, the at least one micro classifier as a good micro classifier.

6. The computer-implemented method of claim 1, further comprising:

responsive to receiving the rejection of the natural language explanation from the user, denoting, by the one or more processors, the at least one micro classifier as a bad micro classifier; and pruning, by the one or more processors, the at least one micro classifier from the set of micro classifiers.

7. A computer program product comprising:

one or more computer readable storage media and program instructions stored on the one or more computer readable storage media, the program instructions comprising:

program instructions to receive a set of labeled data and a set of unlabeled data from the user through the user interface on the computing device;

program instructions to train the statistical classifier on the set of labeled data to learn to assign a respective label based on the set of labeled data, wherein a respective label correlates to a subject matter of a respective piece of data;

program instructions to train the statistical classifier on the set of unlabeled data to learn to assign a respective label to a respective input;

program instructions to perform data augmentation using the statistical classifier on the set of unlabeled data to produce augmented unlabeled data;

program instructions to train a neural network on the augmented unlabeled data and the set of labeled data to produce the set of micro classifiers;

program instructions to receive an input to be classified by the statistical classifier;

program instructions to receive a label assigned to the input by the statistical classifier and respective labels assigned by each micro classifier of the set of micro classifiers;

program instructions to determine that the label assigned by the statistical classifier is the same as at least one label assigned by at least one micro classifier of the set of micro classifiers; and program instructions to generate a natural language explanation for assigning the label using the at least one micro classifier and the label assigned by the statistical classifier.

8. The computer program product of claim 7, wherein the program instructions to receive the input further comprise:

program instructions to receive the input from a user through a user interface on a computing device.

9. The computer program product of claim 7, wherein the at least one micro classifier of the set of micro classifiers includes at least two micro classifiers of the set of micro classifiers.

10. The computer program product of claim 9, wherein the program instructions to generate the natural language explanation for assigning the label using the at least one micro classifier and the label assigned by the statistical classifier further comprise:

program instructions to review an accuracy percentage of each of the at least two micro classifiers during training in correctly assigning a respective label to a piece of data;

program instructions to select a respective micro classifier of the at least two micro classifiers with a higher accuracy percentage; and program instructions to generate the natural language explanation for assigning the label using the selected micro classifier and the label assigned by the statistical classifier.

11. The computer program product of claim 7, further comprising:

responsive to receiving the acceptance of the natural language explanation from the user, program instructions to output additional natural language explanations for additional inputs using the at least one micro classifier; and program instructions to denote the at least one micro classifier as a good micro classifier.

12. The computer program product of claim 7, further comprising:

responsive to receiving the rejection of the natural language explanation from the user, program instructions to denote the at least one micro classifier as a bad micro classifier; and program instructions to prune the at least one micro classifier from the set of micro classifiers.

13. A computer system comprising:
one or more computer processors;
one or more computer readable storage media;
program instructions stored on the computer readable storage media for execution by at least one of the one or more processors, the program instructions comprising:
program instructions to receive a set of labeled data and a set of unlabeled data from the user through the user interface on the computing device;
program instructions to train the statistical classifier on the set of labeled data to learn to assign a respective label based on the set of labeled data, wherein a respective label correlates to a subject matter of a respective piece of data;
program instructions to train the statistical classifier on the set of unlabeled data to learn to assign a respective label to a respective input;
program instructions to perform data augmentation using the statistical classifier on the set of unlabeled data to produce augmented unlabeled data;
program instructions to train a neural network on the augmented unlabeled data and the set of labeled data to produce the set of micro classifiers;
program instructions to receive an input to be classified by the statistical classifier;
program instructions to receive a label assigned to the input by the statistical classifier and respective labels assigned by each micro classifier of the set of micro classifiers;
program instructions to determine that the label assigned by the statistical classifier is the same as at least one label assigned by at least one micro classifier of the set of micro classifiers; and
program instructions to generate a natural language explanation for assigning the label using the at least one micro classifier and the label assigned by the statistical classifier.

14. The computer system of claim 13, wherein the at least one micro classifier of the set of micro classifiers includes at least two micro classifiers of the set of micro classifiers.

15. The computer system of claim 14, wherein the program instructions to generate the natural language explanation for assigning the label using the at least one micro classifier and the label assigned by the statistical classifier further comprise:
program instructions to review an accuracy percentage of each of the at least two micro classifiers during training in correctly assigning a respective label to a piece of data;
program instructions to select a respective micro classifier of the at least two micro classifiers with a higher accuracy percentage; and
program instructions to generate the natural language explanation for assigning the label using the selected micro classifier and the label assigned by the statistical classifier.

16. The computer system of claim 13, further comprising:
responsive to receiving the acceptance of the natural language explanation from the user, program instructions to output additional natural language explanations for additional inputs using the at least one micro classifier; and
program instructions to denote the at least one micro classifier as a good micro classifier.

17. The computer system of claim 13, further comprising:
responsive to receiving the rejection of the natural language explanation from the user, program instructions to denote the at least one micro classifier as a bad micro classifier; and
program instructions to prune the at least one micro classifier from the set of micro classifiers.

* * * * *